UNITED STATES PATENT OFFICE.

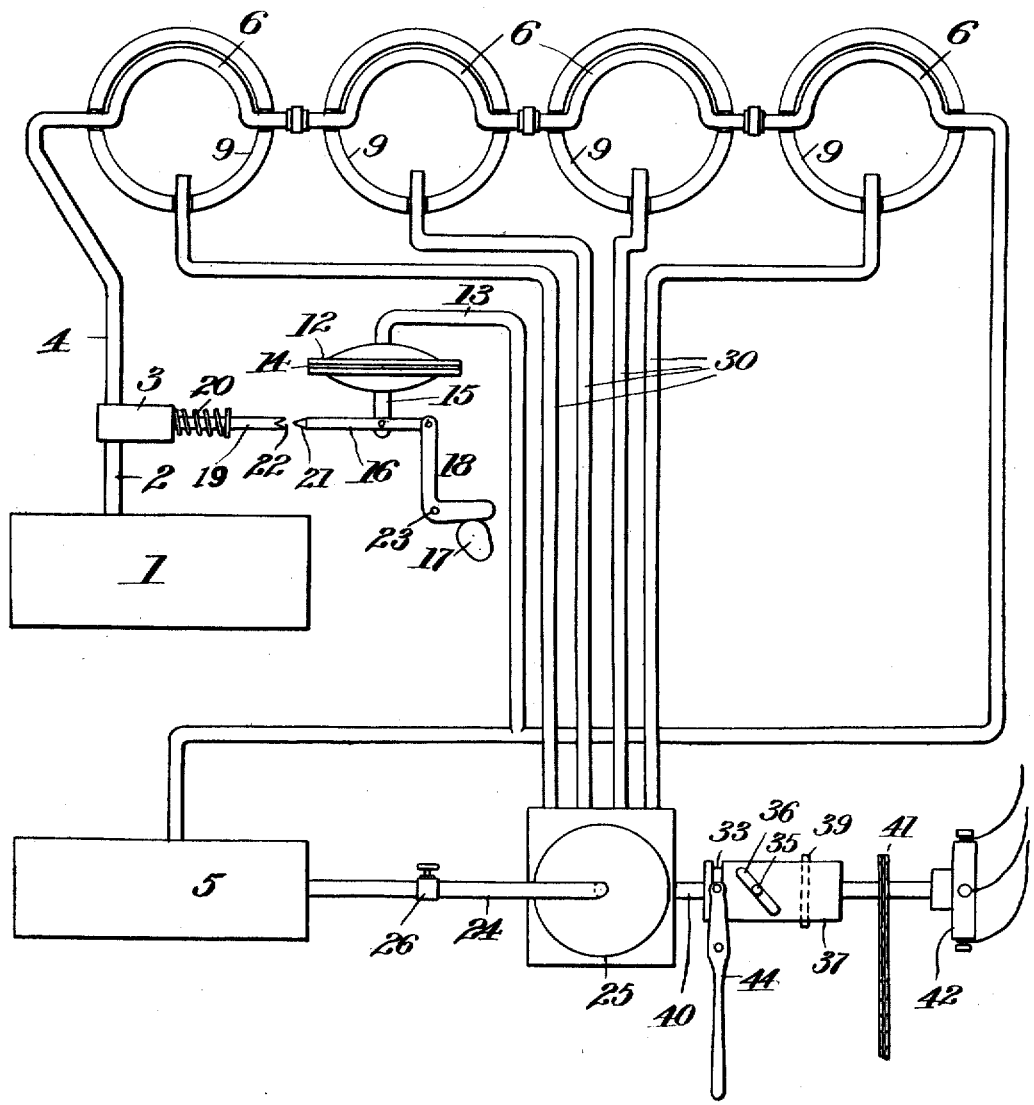

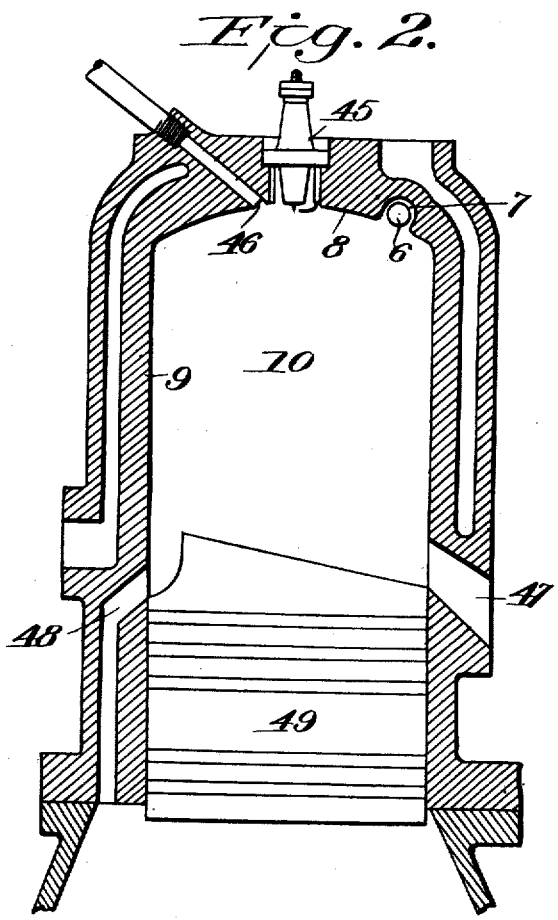
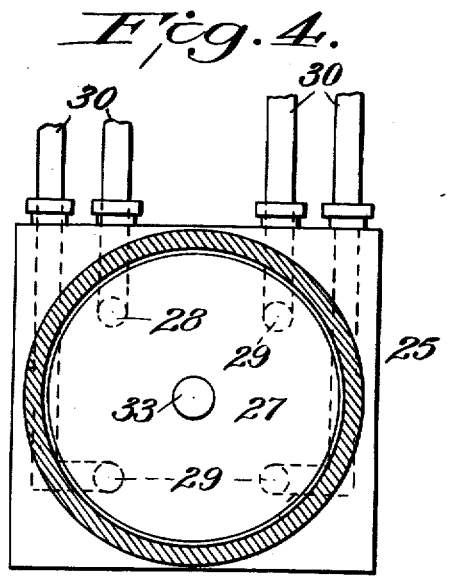
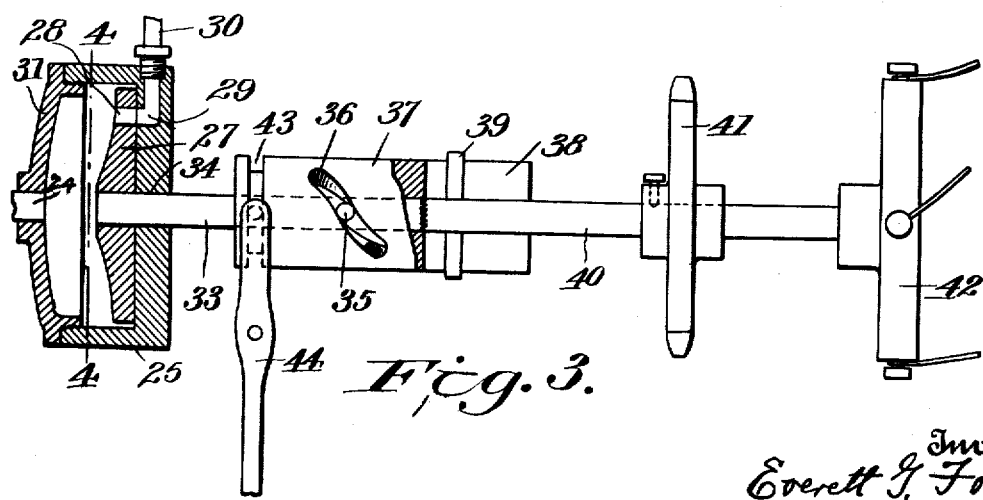

EVERETT G. FORD, OF GLENDALE, CALIFORNIA, ASSIGNOR OF ONE-THIRD TO GEO. W. NEILL, OF TORRANCE, CALIFORNIA, AND ONE-THIRD TO A. H. BARTLETT.

INTERNAL-COMBUSTION ENGINE.

1,311,504.  Specification of Letters Patent.  Patented July 29, 1919.

Application filed June 20, 1917. Serial No. 175,894.

*To all whom it may concern:*

Be it known that I, EVERETT G. FORD, a citizen of the United States, residing at Glendale, in the county of Los Angeles and State of California, have invented certain new and useful Improvements in Internal-Combustion Engines, of which the following is a specification.

The present invention relates to improvements in internal combustion engines, into the cylinder of which is introduced compressed air and gaseous fuel which is mixed with the compressed air within the cylinders on the compression stroke.

The object of the present invention is to improve the construction of internal combustion engines of the two cycle type and to provide a simple, practical and efficient internal combustion engine of increased efficiency adapted to effect a heating of the gasolene or other hydrocarbon liquid and a changing of the same into gaseous form by passing such liquid fuel around the explosion chambers of the cylinders and equipped with means for automatically supplying the fuel to the engine and for controlling the pressure of the gas introduced into the cylinders whereby a steady operation of the engine with a maximum efficiency is obtained.

A further object of the invention is to provide means for introducing individual charges of fuel into the cylinders during the compression stroke and for varying the period of such introduction of fuel into the cylinders between the commencement of the compression stroke and the firing of the charge and to inject the fuel across the point of the spark plug whereby a complete explosion of the charge will be produced when the engine is throttled down as well as when working under full capacity.

Another object of the invention is to provide a practically noiseless two cycle internal combustion engine having air inlet and exhaust ports arranged to permit both an uninterrupted entrance of compressed air and an escape of the exploded gases when uncovered by the piston.

With these and other objects in view, the invention consists in the novel construction, combination and arrangements of parts hereinafter fully described, illustrated in the accompanying drawings, and pointed out in the claims hereto appended, it being understood that various changes in the form, proportion and minor details of construction within the scope of the claims may be resorted to without departing from the spirit or sacrificing any of the advantages of the invention.

In the drawings:—

Figure 1 is a diagrammatic arrangement of an internal combustion engine constructed in accordance with this invention.

Fig. 2 is a vertical sectional view through one of the cylinders.

Fig. 3 is a sectional view of the distributer and the means for adjusting the same with relation to the spark timing device.

Fig. 4 is a sectional view on the line 4—4 of Fig. 3.

Like numerals of reference designate corresponding parts in the several figures of the drawing.

In the accompanying drawing in which is illustrated the preferred embodiment of the invention, 1 designates a tank or receptacle designed to contain gasolene or other liquid hydrocarbon and connected by a pipe 2 with a suction pump 3 adapted to force the liquid fuel from the tank into a generator tube 4. The generator tube 4 which is connected with a gas tank or receptacle 5 is provided with conduits or portions 6 consisting of coils or partial coils arranged in grooves 7 in the heads or ends 8 of cylinders 9 to subject the liquid fuel to the heat of the explosion chambers 10 of the cylinders to convert the liquid fuel into gaseous form so that a heated charge of gas may be introduced into the cylinders as hereinafter more fully explained. The conduits or passages which are located at the inner side of the water jacket or other cylinder cooling means so as to be subjected to the direct action of the heat of the explosion may be cast in the cylinder heads and consist of passages or formed in any other desired manner. The conduits or passages or coils may be of any desired length and the generator tube preferably enters each cylinder at one side and leaves the same at the opposite side as shown. Also the conduit portions 6 may be spaced from the walls of the grooves to permit the gas to pass around them to increase the heating action by subjecting them completely to the fire of the explosion.

The generator pipe is connected at a point between the gas tank or holder 5 and the cylinders with a fluid pressure regulator 12 by a branch pipe 13. The fluid pressure regulator 12 which may be of any desired construction may consist of a casing having a diaphragm 14 or a cylinder having a spring actuated piston and it is connected by a stem or rod 15 with a plunger bar 16 actuated by a cam 17 and a lever 18, and adapted to engage the piston rod 19 of the pump 3 for moving the piston thereof in one direction against the action of a spring 20 which urges the piston in the opposite direction. The plunger bar 16 has a tapered end 21 which fits in a tapered socket 22 of the piston rod when the parts are in alinement, the position of the plunger bar being controlled by the gas pressure regulator to elevate the plunger bar when the pressure of the gas within the tank 5 falls below a predetermined limit, and to lower the plunger bar when the gas within the tank or holder 5 increases beyond a predetermined pressure so that the pump will be operated only within certain limits to maintain the desired pressure within the gas tank or holder. The parts may be arranged so that the plunger bar will be depressed below the piston rod and caused to miss the same only when the pressure increases beyond a predetermined point. The lever 18 is preferably of bell crank form and pivoted at its angle at 23 and the cam may be operated by any suitable means. The pump is adapted to act as an auxiliary to the engine in drawing the liquid fuel in the form of a liquid from the fuel tank and forcing the liquid into the coils of the generator and pressure tank or gas holder 5 to supply sufficient gas to operate the engine.

The gas tank or holder is connected by a tube or pipe 24 with a distributer 25, the flow of gas being controlled by a suitable valve 26. The distributer consists of a rectangular casing and a rotary valve 27 provided with a port 28 adapted to be carried successively into register with ports or openings 29 with which individual tubes 30 are connected for supplying gas to the cylinders 9 in firing order. The distributer is provided with a movable circular cap 31, having a threaded connection 32 with the distributer casing and centrally tapped to receive the gas supply pipe 24. The ports or openings 29 are located at intervals at one of the walls of the distributer and a rotary valve which is mounted on a shaft or stem 33 is fitted against the said wall as clearly shown in Fig. 3. The shaft or stem 33 extends through a central opening 34 of the said wall of the distributer and it is provided with a pin 35 operating in a cam slot 36 of a slidable sleeve 37. The sleeve 37 is slidably interlocked by a slot 38 and a pin 39 with a shaft 40 actuated by sprocket gearing 41 or other suitable means and connected with a spark timing device 42 of any desired construction. The slidable sleeve which is provided with an annular groove 43 to receive a forked operating lever 44 is adapted to be moved longitudinally of the said shafts 33 and 40 to change the position of the rotary valve of the distributer with relation to the spark timing device for introducing the charge of gas into each cylinder at the proper time prior to the ignition and explosion of the charge.

The individual feed tubes enter the heads 7 of the cylinders at an acute angle to the spark plugs 45 and the discharge ends 46 of the said individual tubes inject the gas into the cylinders across the points of the spark plugs so as to insure a complete explosion of the charge when the engine is throttled down as well as when the same is operating under full capacity.

The cylinders are provided with air inlet ports or openings 47 and exhaust ports or openings 48 arranged at an inclination to the direction of the movement of the pistons 49 to permit an unobstructed entrance of compressed air and a free exhaust of the exploded gases. Any suitable means may be employed for supplying compressed air to the cylinders. The combustion chambers of the cylinders are adapted to contain oxygen in excess of that necessary to produce complete combustion of the charge of gas forced into the cylinders and will prevent the explosive mixture from being over rich and avoid accumulation of carbon deposit in the combustion chambers. This full compression will cause the mixture to explode more readily and expand more quickly and will produce the highest efficiency. Also the mixture attains a maximum compression prior to explosion, and the engine may be operated at a fraction of its full capacity at the same efficiency as when working at its full capacity without causing the engine to operate irregularly or in a jerkey or uneven manner.

What I claim is:—

1. An internal combustion engine comprising cylinders, a generator conduit having coil portions located within the cylinders and heated by the products of combustion, a gas holder connected with the generator conduit, and means for supplying fuel to the generator conduit including a gas pressure regulator controlled by the pressure within the gas holder.

2. An internal combustion engine comprising cylinders, a generator conduit having coil portions located within the cylinders and heated by the products of combustion, a gas holder connected with the generator conduit, and means for supplying fuel to the generator conduit including a pump, means for actuating the same, and a gas pressure regulator controlled by the pressure within the gas holder for controlling the pump actuating means.

3. An internal combustion engine comprising cylinders, a generator conduit having coil portions located within the cylinders and heated by the products of combustion, a gas holder connected with the generator conduit, means for supplying fuel to the generator conduit including a pump, a plunger bar for actuating the pump, means for reciprocating the plunger bar, and a gas pressure regulator controlled by the pressure within the gas holder and connected with the plunger bar for moving the same into and out of position for operating the pump.

4. An internal combustion engine comprising cylinders, a generator conduit having coil portions located within the cylinders and heated by the products of combustion, a gas holder connected with the generator conduit, means for supplying fuel to the generator conduit including a pump, a plunger bar for actuating the pump, a lever connected with the plunger bar, a cam arranged to engage the lever for moving the plunger bar to operate the pump, and means controlled by the pressure within the gas holder for moving the plunger bar into and out of position for operating the pump.

5. An internal combustion engine comprising cylinders, a generator conduit having coil portions located within the cylinders and heated by the products of combustion, a gas holder connected with the generator conduit, means for supplying fuel to the generator conduit including a pump, a plunger bar for actuating the pump, a bell crank lever pivotally connected with the plunger bar, a cam arranged to engage the bell crank lever for actuating the plunger bar, and a gas pressure device controlled by the pressure within the gas holder and connected with the plunger bar for moving the same into and out of position for operating the pump.

6. An internal combustion engine comprising cylinders, a generator conduit in the cylinders and having curved portions located at the heads of the cylinders and heated by the products of combustion, a gas holder connected with the generator conduit, and means for supplying fuel to the generator conduit including a gas pressure regulator controlled by the pressure within the gas holder.

7. An internal combustion engine comprising cylinders, a generator conduit extending into the cylinders at opposite sides thereof and having curved portions located in the heads of the cylinders and heated by the products of combustion, means for supplying the conduit with fuel, a gas holder connected with the generator conduit, and means for supplying the cylinders with gas including a distributer having valve mechanism and individual pipes connected with the distributer and with the cylinders and controlled by the valve mechanism for supplying gas to the cylinders in firing order.

8. An internal combustion engine comprising cylinders, a generator conduit extending into the cylinders at opposite sides thereof and having curved portions located in the heads of the cylinders and heated by the products of combustion, means for supplying the conduit with fuel, a gas holder connected with the generator conduit, and means for supplying the cylinders with gas including a distributer having a rotary valve and individual pipes connected with the distributer and with the cylinders and controlled by the rotary valve for supplying gas to the cylinders in firing order.

9. An internal combustion engine comprising cylinders, a generator conduit extending into the cylinders at opposite sides thereof and having curved portions located in the heads of the cylinders and heated by the products of combustion, means for supplying the conduit with fuel, a gas holder connected with the generator conduit, means for supplying the cylinders with gas including a distributer having a rotary valve and individual pipes connected with the distributer and with the cylinders and controlled by the rotary valve for supplying gas to the cylinders in firing order, a spark timing device, and means for connecting the rotary valve with the spark timing device for changing the position of the rotary valve with relation to the position of the pistons at the time of the injection of said gas.

10. An internal combustion engine comprising cylinders, a generator conduit extending into the cylinders at opposite sides thereof and having curved portions located in the heads of the cylinders in the firing chamber and heated by the products of combustion, means for supplying the conduit with fuel, a gas holder connected with the generator conduit, means for supplying the cylinders with gas including a distributer having a rotary valve and individual pipes connected with the distributer and with the cylinders and controlled by the rotary valve for supplying gas to the cylinders in firing order, a spark timing device, means for connecting the rotary valve with the spark timing device for changing the position of the former with relation to the latter, said means including a slidable sleeve connected with the spark timing device and having a cam slot, and a stem or shaft connected with the valve and having a pin operating in the slot.

11. An internal combustion engine comprising cylinders, a generator conduit extending into the cylinders at opposite sides thereof and having curved portions located in the heads of the cylinders and heated by the products of combustion, means for supplying the conduit with fuel, a gas holder connected with the generator conduit, means for supplying the cylinders with gas including a distributer having a rotary valve and individual pipes connected with the distributer and with the cylinders and controlled by the rotary valve for supplying gas to the cylinders in firing order, a spark timing device, means for connecting the rotary valve with the spark timing device for changing the position of the former with relation to the latter, a rotary shaft connected with the spark timing device, a sleeve slidably interlocked with the shaft and having a cam slot, a stem connected with the valve and having a pin operating in the slot, and operating means for sliding the sleeve along the shaft.

12. An internal combustion engine including cylinders, a generator conduit having portions located within the cylinders and heated thereby, a tank connected with the generator conduit for supplying fuel to the same, a pump connected with the tank and the conduit, a gas holder communicating with the conduit, mechanism for operating the pump having a member movable into and out of operative position to operate and stop the pump, a gas pressure device connected with the movable member and controlled by the pressure within the gas holder for moving the said member to and from its operative position, a distributer connected with the gas holder and having a valve, individual pipes connecting the distributer with the cylinders and controlled by the valve for supplying gas to the same in firing order, and means for operating the valve.

13. An internal combustion engine including cylinders, a generator conduit having portions located within the cylinders and heated thereby, a tank connected with the generator conduit for supplying fuel to the same, a pump connected with the tank and the conduit, a gas holder communicating with the conduit, mechanism for operating the pump having a member movable into and out of operative position to operate and stop the pump, a fluid pressure device connected with the movable member and controlled by the pressure within the gas holder for moving the said member to and from its operative position, a distributer connected with the gas holder and having a valve, individual pipes connecting the distributer with the cylinders and controlled by the valve for supplying gas to the same in firing order, a spark timing device, and adjustable means for connecting the valve with a spark timing device.

In testimony whereof I affix my signature in the presence of two witnesses.

EVERETT G. FORD.

Witnesses:
GEO. W. NEILL,
A. H. BARTLETT.